US009038704B2

(12) United States Patent
Williamson

(10) Patent No.: US 9,038,704 B2
(45) Date of Patent: May 26, 2015

(54) ALUMINUM ALLOY COMPOSITIONS AND METHODS FOR DIE-CASTING THEREOF

(75) Inventor: Warren G. Williamson, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 13/438,525

(22) Filed: Apr. 3, 2012

(65) Prior Publication Data

US 2012/0273154 A1 Nov. 1, 2012

Related U.S. Application Data

(60) Provisional application No. 61/471,323, filed on Apr. 4, 2011, provisional application No. 61/486,035, filed on May 13, 2011.

(51) Int. Cl.
*B22D 21/04* (2006.01)
*C22C 21/02* (2006.01)
*C22C 21/04* (2006.01)
*B23K 35/28* (2006.01)

(52) U.S. Cl.
CPC ............... *B22D 21/04* (2013.01); *C22C 21/02* (2013.01); *C22C 21/04* (2013.01); *B23K 35/286* (2013.01)

(58) Field of Classification Search
USPC .................................. 164/113, 120; 420/548
See application file for complete search history.

(56) References Cited

U.S. PATENT DOCUMENTS

| 4,850,819 A | 7/1989 | Bush et al. |
| 4,975,243 A | 12/1990 | Scott et al. |
| 5,055,255 A | 10/1991 | Scott et al. |
| 5,064,356 A | 11/1991 | Horn |
| 5,162,065 A | 11/1992 | Scott et al. |
| 5,267,844 A | 12/1993 | Grassbaugh et al. |
| 6,752,885 B1 | 6/2004 | Jerichow |
| 6,918,970 B2 | 7/2005 | Lee et al. |

(Continued)

FOREIGN PATENT DOCUMENTS

| CN | 1410572 A | 4/2003 |
| CN | 1619004 A | 5/2005 |

(Continued)

OTHER PUBLICATIONS

J. R. Davis, Aluminum and Aluminum Alloys, 1993, ASM International, pp. 713-714.*

(Continued)

*Primary Examiner* — Kevin E Yoon
(74) *Attorney, Agent, or Firm* — Harness, Dickey & Pierce, P.L.C.

(57) ABSTRACT

Aluminum alloys are provided that have improved fluidity and elongation, as well as freedom of die soldering. The aluminum alloys are particularly suitable for die-casting of structural components. The aluminum alloy includes silicon at from about 8 weight % to about 11 weight %, manganese at from about 0.8 weight % to about 1.9 weight %, iron at from about 0.1 weight % to about 0.5 weight %, magnesium at from about 0.2 weight % to about 0.7 weight %, boron at from about 0.002 weight % to about 0.15 weight %, strontium at from about 0.006 weight % to about 0.017 weight %, less than about 0.25 weight % copper, less than about 0.35 weight % zinc, less than about 0.25 weight % titanium, and a balance of aluminum. Methods related to the aluminum alloys are also provided.

17 Claims, 6 Drawing Sheets

(56) References Cited

U.S. PATENT DOCUMENTS

| | | | |
|---|---|---|---|
| 6,921,512 B2 | 7/2005 | Doty | |
| 7,051,785 B2* | 5/2006 | Dewispelaere et al. | 164/113 |
| 7,108,042 B2 | 9/2006 | Koch | |
| 7,179,069 B2 | 2/2007 | Grassbaugh | |
| 7,413,423 B2 | 8/2008 | Bonifas | |
| 2003/0136477 A1* | 7/2003 | Kitaoka et al. | 148/415 |
| 2003/0143102 A1 | 7/2003 | Matsuoka et al. | |
| 2004/0170523 A1 | 9/2004 | Koch | |
| 2004/0261968 A1* | 12/2004 | Fulton et al. | 164/4.1 |
| 2005/0199318 A1* | 9/2005 | Doty | 148/439 |
| 2006/0011321 A1 | 1/2006 | Koch | |
| 2006/0027291 A1 | 2/2006 | Matsuoka et al. | |
| 2007/0144629 A1 | 6/2007 | Okamoto | |

FOREIGN PATENT DOCUMENTS

| | | |
|---|---|---|
| DE | 102009036056 A1 | 2/2011 |
| EP | 0724077 A1 | 7/1996 |
| EP | 1331281 A1 | 7/2003 |
| EP | 1972695 A1 | 9/2008 |
| JP | 4-202737 A | 7/1992 |
| JP | 5-208296 A | 8/1993 |
| JP | 7-048644 | 2/1995 |
| JP | 09125181 A | 5/1997 |
| JP | 10-204566 | 8/1998 |
| JP | 2003213354 A | 7/2003 |
| JP | 2006-322032 A | 11/2006 |
| JP | 2008-111153 A | 5/2008 |
| JP | 2009024265 A | 2/2009 |
| KR | 10-2004-0088857 A | 10/2004 |
| RU | 2067041 C1 | 9/1996 |
| RU | 2224811 C2 | 2/2004 |
| TW | 229699 | 3/2005 |
| WO | 00/71767 A1 | 11/2000 |
| WO | 00/71772 A1 | 11/2000 |
| WO | 2012/138767 A2 | 10/2012 |

OTHER PUBLICATIONS

Scroll Compressors, Carrier Corporation, 2004.*
International Search Report regarding Application No. PCT/US2012/032181, mailed Oct. 19, 2012.
Written Opinion of the International Searching Authority regarding Application No. PCT/US2012/032181, mailed Oct. 19, 2012.
Extended European Search Report regarding Application No. 12767365.5-1362 / 2694692 PCT/US2012032181, dated Jul. 25, 2014.
ASTM Standard B557-10, "Standard Test Methods for Tension Testing Wrought and Cast Aluminum- and Magnesium-Alloy Products," ASTM International, West Conshohocken, PA, (2010), DOI: 10.1520/B0557-10, www.astm.org (Abstract only).
Dupen, Barry, "Alloy Design by Spreadsheet," Materials Science & Technology 2006 Conference and Exhibition, Cincinnati, OH, Oct. 15-19, 2006, pp. 3508-3516 (2006) (Abstract only).
International Preliminary Report on Patentability mailed on Oct. 8, 2013 for PCT International Application No. PCT/US2012/032181.
Notification of the First Office Action mailed Dec. 2, 2014 for Chinese Patent Application No. 201280021958.8 (Pub. No. CN 103502491).
First Office Action mailed Dec. 8, 2014 for Russian Patent Application No. 2013148634.

* cited by examiner

ALUMINUM ALLOY COMPOSITIONS AND METHODS FOR DIE-CASTING THEREOF

CROSS-REFERENCE TO RELATED APPLICATIONS

This application claims the benefit of U.S. Provisional Application No. 61/471,323 filed on Apr. 4, 2011 and U.S. Provisional Application No. 61/486,035 filed on May 13, 2011. The entire disclosures of each of the above applications are incorporated herein by reference.

FIELD

The present disclosure relates to aluminum die-casting alloy compositions and more particularly, use of the aluminum alloys to fabricate structural components for refrigeration and/or heating ventilation and air conditioning (HVAC) systems.

BACKGROUND

The statements in this section merely provide background information related to the present disclosure and may not constitute prior art.

Metal alloys are useful in a variety of applications including in refrigeration; heating, ventilation, and air conditioning (HVAC); and other mechanical or electromechanical applications. The primary alloying metal and other alloying agents are selected based on industry standards or customs, the desired structural integrity of the final piece, and the desired method of forming the final piece.

An exemplary metal alloy is an aluminum-based alloy. Aluminum-based alloys can be formed by a wrought process or by a casting technique such as die-casting, sand casting, permanent and semi-permanent mold casting, plaster-mold casting, and investment casting. Cast parts are generally formed by pouring a molten metal into a casting mold that provides shape to the molten material as it cools and solidifies. The mold is later separated from the part after solidification. When casting alloys, industry standards determine which alloy materials and amounts are included, despite the ongoing need for improved casting, fluidity, elongation, and other characteristics of existing alloys. Further, the need to remove the cast piece from the mold guides the selection of alloy materials and often serves as a deterrent for countering long-standing, customary guidelines on the selection of alloy components and relative amounts of the components.

SUMMARY

In various aspects, methods of forming a structural component are provided. An aluminum alloy material is cast to form a solid structural component. The aluminum alloy includes silicon at from about 8 weight % to about 11.6 weight %, manganese at from about 0.8 weight % to about 1.9 weight %, iron at from about 0.1 weight % to about 0.5 weight %, magnesium at from about 0.2 weight % to about 0.7 weight %, boron at from about 0.002 weight % to about 0.15 weight %, strontium at from about 0.006 weight % to about 0.017 weight %, less than about 0.25 weight % copper, less than about 0.35 weight % zinc, less than about 0.25 weight % titanium and a balance of aluminum. In select aspects, the silicon is greater than or equal to 10 weight % and the manganese is greater than or equal to 1 weight % of the aluminum alloy.

In still other features of the present teachings, methods of forming a structural component for a component of a compressor include casting an aluminum alloy material having a synergistic amount of manganese and silicon into a shape of the structural component, and solidifying the aluminum alloy to have an elongation of greater than or equal to 7% and a tensile strength of greater than or equal to 38,000 psi. In various aspects, the elongation is greater than or equal to 9%. In still other aspects, the tensile strength is greater than or equal to 40,000 psi. The structural component is useful for a compressor; a refrigeration device; or a heating, ventilation, and air conditioning device in various aspects.

In still other aspects, an aluminum alloy consists essentially of: silicon at from 8 weight % to 11.6 weight %, manganese at from 0.8 weight % to 1.9 weight %, iron at from 0.1 weight % to 0.5 weight %, magnesium at from 0.2 weight % to 0.7 weight %, boron at from 0.002 weight % to 0.15 weight %, strontium at from 0.006 weight % to 0.017 weight %, less than about 0.25 weight % copper, less than about 0.35 weight % zinc, less than about 0.25 weight % titanium, and a balance weight percent of aluminum.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
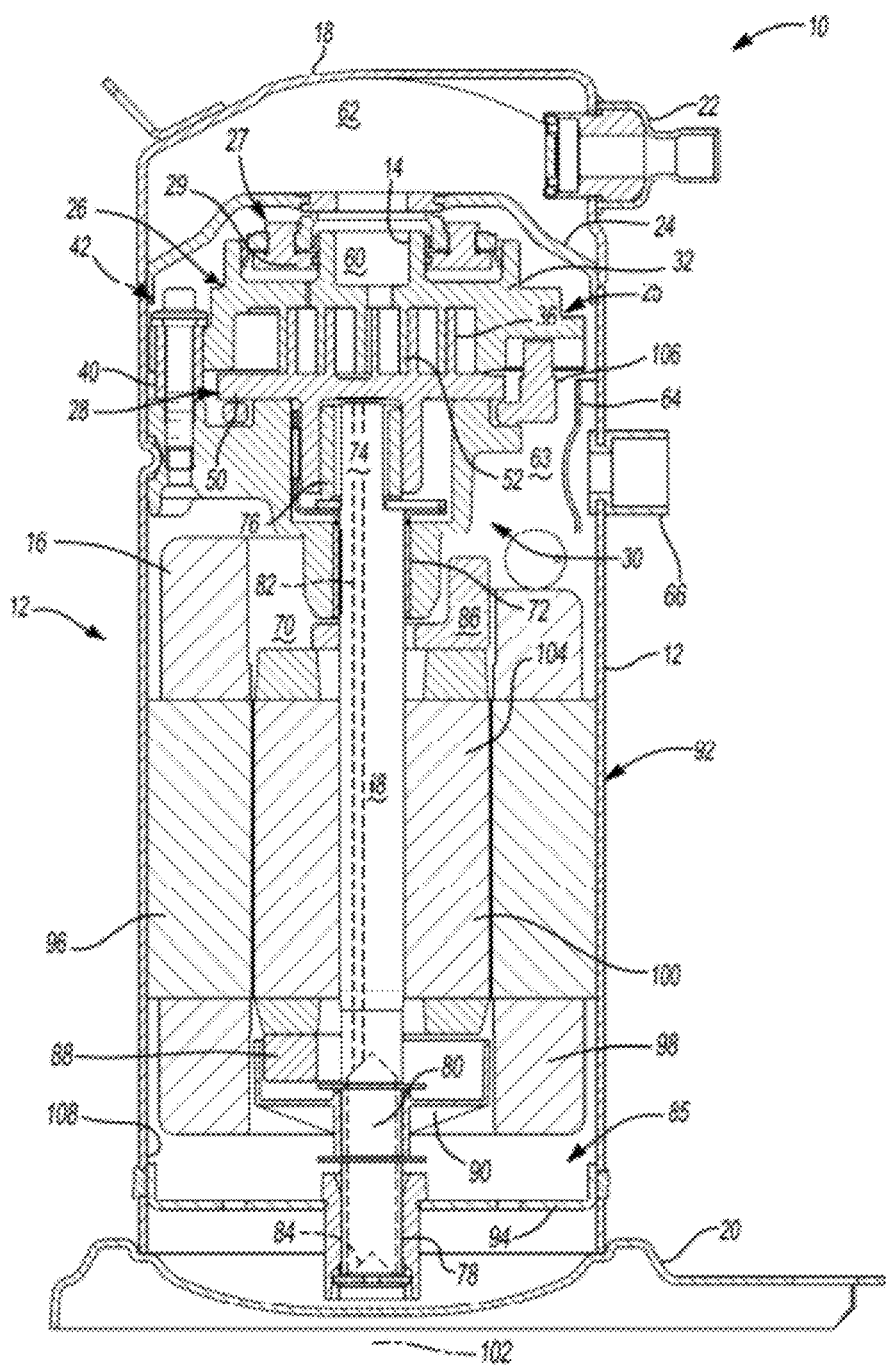
FIG. 1 is a cross-sectional view of a scroll machine according to various aspects of the present teachings.

The following description is merely exemplary in nature and is not intended to limit the present disclosure, application, or uses. It should be understood that throughout the drawings, corresponding reference numerals indicate like or corresponding parts and features.

The present teachings relate to aluminum alloys for die-casting. The aluminum alloys are useful for a variety of applications including to cast the components of a compressor or another element in a refrigeration and/or heating, ventilation, and air conditioning (HVAC) device. An exemplary compressor is a scroll compressor 10 as depicted in FIG. 1. While the scroll compressor 10 is used as the primary example in the present disclosure, it is understood that these teachings are applicable to other types of compressors (e.g., reciprocating compressors). Further, the principles of the present disclosure also pertain to other mechanical or electromechanical devices, including engines, pumps, and other devices including seals and related components, such as a lower seal plate, Oldham couplings, bearings, fittings, fasteners, various fluid passageways, and the like, related to heating, ventilation, and air conditioning (HVAC) systems, refrigeration systems, and other systems. For clarity, a description of the exemplary scroll compressor 10 is provided first, followed by details on the aluminum alloy.

Scroll Machines

With reference to FIG. 1, the scroll machine 10 includes a hermetic shell 12, a compressor section 14, and a motor-drive section 16. The hermetic shell 12 facilitates "hermetically sealing" the device so that it is impervious to gases. The hermetic shell 12 is generally cylindrical in shape as shown. The hermetic shell 12 includes a cap 18 welded at the upper end thereof and a base 20 welded at the lower end thereof. The cap 18 includes a refrigerant-discharge fitting 22, which may have a discharge valve therein (not shown). The hermetic shell 12 also includes a suction inlet fitting 66 to create a suction chamber 63. The base 20 includes a plurality of mounting feet (not shown) integrally formed therewith. The hermetic shell 12 may further include a transversely extending partition 24 that is welded about its periphery at the same point that the cap 18 is welded to the hermetic shell 12.

The compressor section 14 includes a compression mechanism 25, a non-orbiting scroll member 26, a seal assembly 27, an orbiting scroll member 28, and a bearing housing 30. The non-orbiting scroll member 26 includes an end plate 32 having a spiral wrap 36 extending therefrom. The non-orbiting scroll member 26 is secured to the bearing housing 30 and may include a plurality of sleeve guides 40 that attach the non-orbiting scroll member 26 to the bearing housing 30 by a plurality of bolts 42. The seal assembly 27 includes a lower seal plate 29 and may be adjacent the non-orbiting scroll end plate 32.

The orbiting scroll member 28 includes an end plate 50 and a spiral wrap 52 that extends upright from the end plate 50. The spiral wrap 52 is meshed with the spiral wrap 36 of the non-orbiting scroll member 26 to form compression chambers 54 that may fluidly communicate with a discharge port 60. The discharge port 60 communicates with a discharge chamber 62 that is optionally formed by the extending partition 24 and the cap 18.

The motor-drive section 16 includes a drive member such as a crankshaft 68 coupled to the orbiting scroll member 28 to drive the compression mechanism. The crankshaft 68 is rotatably journaled in a bearing 72 in the bearing housing 30 and includes an eccentric shaft portion 74. The eccentric shaft portion 74 is coupled to the orbiting scroll member 28 through a drive bushing and bearing assembly 76. The crankshaft 68 is supported by the motor-drive section 16 at a lower end thereof, whereby the lower end of the crankshaft 68 includes a concentric shaft portion 78.

The lower end of the crankshaft 68 includes a concentric bore 80 that communicates with a radially inclined bore 82 extending upwardly therefrom to the top of the crankshaft 68. A lubricant flinger 84 is disposed within the bore to pump fluid disposed in a sump 85 or lower end of the hermetic shell (e.g., within the base 20) through the bores 80, 82 to the compressor section 14 and other portions of the scroll machine 10 requiring lubrication. The lubricant flinger 84 is of the type disclosed in commonly owned U.S. Pat. No. 7,179,069, the disclosure of which is incorporated herein by reference.

Upper and lower counterweights 86, 88 are attached to the crankshaft 68 via a rotor 100. Additionally, a counterweight shield 90 is also provided to reduce the work loss caused by the lower counterweight 88 coming in contact with lubricant disposed within the hermetic shell 12. The counterweight shield 90 may be of the type disclosed in commonly owned U.S. Pat. Nos. 5,064,356 and 7,413,423, the disclosures of which are incorporated herein by reference.

The motor-drive section 16 includes a motor assembly 92 and a lower bearing support member 94. The motor assembly 92 is securely mounted in the hermetic shell 12 and may include a stator 96, windings 98, and the rotor 100. The stator 96 is press fit in the hermetic shell 12, while the rotor 100 is press fit on the crankshaft 68. The stator 96, windings 98, and rotor 100 work together to drive the crankshaft 68 and thereby cause the orbiting scroll member 28 to orbit relative to the non-orbiting scroll member 26 when the motor assembly 92 is energized.

It is understood that the support member 94 may be part of a bearing assembly that includes a variety of subcomponents (not shown) such as a lower bearing and a thrust washer, as non-limiting examples, as detailed in commonly owned U.S. Pat. No. 4,850,819, which is incorporated herein by reference. The support member 94 is attached to the hermetic shell 12 and rotatably supports the crankshaft 68 which rotates about the vertical axis 102 defined by the support member 94 and the lower bearing.

The support member 94 is attached to the hermetic shell 12 in any suitable manner. For example, the support member 94 can be staked to the shell in a manner similar to that described in commonly owned U.S. Pat. No. 5,267,844, the disclosure of which is incorporated herein by reference. Alternatively or additionally, the support member 94 is attached to the hermetic shell 12 using a plurality of fasteners (not shown).

Materials and Methods

In one aspect, the present teachings provide an aluminum-based alloy composition that provides excellent fluidity and elongation for casting, particularly, die-casting. By "aluminum-based," it is meant that the composition is primarily comprised of aluminum, generally greater than 80 weight %. As used herein, the term "composition" refers broadly to a substance containing at least the preferred metal elements or compounds, but which optionally comprises additional substances or compounds, including additives and impurities. The term "material" also broadly refers to matter containing the preferred compounds or composition.

The present disclosure further relates to methods of casting structural components with the various aluminum-based alloys. As used herein, a "structural component" includes a structural or working part of a device that facilitates its operation or placement in a system. As non-limiting examples structural components pertain to other mechanical or electromechanical devices, including engines, pumps, and other devices including seals and related components, such as a lower seal plate, Oldham couplings, bearings, fittings, fasteners, various fluid passageways, and the like, related to heating, ventilation, and air conditioning (HVAC) systems, refrigeration systems, and other systems. The components of the compressor 10 as detailed above are non-limiting examples of structural components.

"Casting," as it is generally known, involves pouring a molten metal alloy into a casting mold to essentially form a solidified cast part in a near-finished state. The molten metal alloy is poured into a mold, where the metal alloy solidifies after cooling, to form a cast part. The aluminum-based alloy of the present teachings is suitable for casting, including die-casting, sand casting, permanent and semi-permanent mold casting, plaster-mold casting, and investment casting. In various aspects, the aluminum alloy is particularly suitable for a die-casting process, where the molten aluminum alloy material passes through a die defining one or more orifices or apertures as it enters a mold cavity during the casting process. While casting techniques are disclosed herein, it is understood that in select instances, the aluminum-based alloys are also useful in wrought processes as are known in the art. In certain variations, the cast solid parts form structural components, which have one or more surfaces that are further machined after casting and solidification.

The instant aluminum alloys of the present teachings convey particularly advantageous properties according to elongation and yield strength, as non-limiting examples. In such embodiments, the elongation and yield strength are measured for example according to ASTM B 557-10, titled "Standard Test Methods for Tension Testing Wrought and Cast Aluminum- and Magnesium-Alloy Products," which is incorporated herein by reference in its entirety.

The present teachings provide formulations for aluminum-based alloys that are sometimes expressed in numerical values, such as percentages. The term "about" when applied to these values or percentages as used in the present teachings indicates that the calculation or the measurement allows some slight imprecision in the value (including near exactness to a value or an approximate or reasonable closeness to the value). If, for some reason, the imprecision provided by "about" is not otherwise understood in the art with this ordinary meaning, then "about" as used herein indicates a possible variation of up to 5% of the indicated value of 5% variance from usual methods of measurement. For example, a component of about 10 weight % could vary between 10±0.5 weight %, thus ranging from between 9.5 and 10.5 weight %. It is understood that all percentages given herein are according to the total weight percentage of the respective aluminum alloys of the present teachings.

In addition, disclosure of ranges includes disclosure of all values and further divided ranges within the entire range, including endpoints given for the ranges. Thus, for example, a range of "from 1 to 2" or "from about 1 to about 2" is inclusive of the value for 1 and for 2. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z.

In various embodiments, the aluminum-based alloy composition includes from about 85 weight % to about 90 weight % aluminum, including all sub-ranges. In other aspects, the aluminum-based alloy composition includes from about 88 weight % to about 90 weight % of aluminum, including all sub-ranges. The components and processing parameters for the aluminum-based alloy are selected to provide appropriate tensile strength, density, ductility, formability, workability, weldability, and corrosion resistance, as limited examples. Notably, the aluminum-based alloys of the present teachings have an improved overall ductility, which is a feature that is difficult and/or not-readily found in aluminum-based alloys or other alloys containing aluminum.

In various embodiments, the aluminum-based alloys include silicon as an alloying component at from about 8 weight % to about 11.6 weight %, including all sub-ranges. In still other aspects, the aluminum-based alloy includes silicon at from about 9 weight % to about 10 weight %, including all sub-ranges. Silicon improves fluidity, hot tear resistance, and feeding characteristics of the alloy. Further, aluminum-based alloys including silicon are resistant to solidification cracking or the cracking along the grain boundaries that occur during the terminal stage of solidification of the part. It is beneficial to prevent the terminal stage cracking to prevent loss of efforts and accompanying resources expended in preparation for casting the part.

Aluminum-based alloys of the present teachings further include manganese as an alloying component. The manganese provides improved fluidity and elongation while maintaining reasonable yield strength, ultimate tensile strength, as well as suitable properties for castability.

The amount of manganese included in the present alloys is greater than the traditionally known cap or limit of 0.8 weight %. To the contrary, aspects of the present teachings significantly increase the amount of manganese to a level of from about 0.8 weight % to about 1.5 weight %, including all sub-ranges. In various embodiments, the level is up to about 1.9 weight % or the theoretical maximum of manganese in an alloy for solubility purposes. In other embodiments, the level is from about 1 weight % to about 1.25 weight %, including all sub-ranges. As stated, this level of manganese is significantly higher than the level of manganese of conventional aluminum alloys, for example, the conventional aluminum alloys known as A360 and A367.

The aluminum alloy A360 includes over 1 weight % of iron which is inadequate to resolve die soldering complications. Further, A360 has low elongation which complicates formation of items, such as structural components of the present teachings. With respect to A367, because the A367 aluminum alloy is a Mercury alloy with a high strontium content, it is prohibitively expensive. Further, A367 does not resolve the die soldering issues, as detailed later herein, and the elongation is inadequate as compared to aluminum alloys of various aspects of the present teachings. Comparative data demonstrating the astounding benefits of the subject aluminum alloys versus these standards is provided in greater detail in the Examples section later herein.

In addition to the manganese being incorporated at an unusually high amount in the alloy, there are further benefits to elimination of previous and conventional models that limit the amount of manganese. As one non-limiting example, it is believed that the combination of silicon and manganese provides a synergistic benefit to the alloy in the current amounts. As used herein, "synergistic" amounts are amounts when delivered together provide a greater impact than the additive effect of each alloying component individually. As shown in the Examples section, the synergistic combination and the new amounts which are counter to traditional teachings provide unexpected benefits of elongation and fluidity, and further provide excellent castability. In certain aspects, the synergistic amount of manganese and silicon comprises from about 0.8 weight % to about 1.9 weight % of manganese and from about 8 weight % to about 11.6 weight % silicon, including all sub-ranges. In still other aspects, the synergistic amount of manganese and silicon comprises from about 1 weight to about 1.2 weight % of manganese and from about 9 weight % to about 10 weight % silicon, including all sub-ranges.

The high levels of and synergistic combination of silicon and manganese provide improvements over currently known alloys such as A360, which is known to be aggressive towards tooling and lacks the necessary fluidity for optimal casting applications. Also, the tool life is improved when using aluminum alloys of the present teachings as compared to A360, as an example, because of the ease of removal of the cast part from the die and the minimal "sticking" of the cast part to the die. Further, the alloys and methods of the present teachings are suitable for sand-casting or permanent mold casting.

Other additives optionally include from about 0.1 weight % to about 0.5 weight % iron. It is believed that the iron improves the mechanical properties of the instant aluminum alloys. As indicated in the Examples, this weight % range of iron improves casting and in turn increases the yield strength and the elongation or ductility of the instant aluminum alloys. Notably, in certain aspects, it is believed that when this upper range of iron is exceeded, the combined interaction of manganese and iron may serve to worsen the elongation properties of the instant aluminum alloy materials.

Magnesium is also optionally included in various embodiments of the instant aluminum-alloy composition at from about 0.2 weight % to about 0.7 weight %, including all sub-ranges. The magnesium serves as a low cost additive that is provides relatively high strength through a range of temperatures, particularly at lower temperatures.

Still other optional additives include from about 0.002 weight to about 0.015 weight % boron, including all sub-ranges. In various embodiments, the boron can be used as a grain refiner or to impart heat resistance to the alloy. Another additive is strontium, which in various embodiments is optionally included at from about 0.006 weight % to about 0.017 weight %, including all sub-ranges. In various embodiments, the strontium provides improved mechanical properties and creep-resistance to the alloys by means of eutectic modification. As used herein, "eutectic" refers to a mixture of chemical compounds or elements that corresponds to the eutectic point, where a single liquid phase isothermally and reversibly transitions into two or more solid phases. The eutectic chemical composition generally solidifies at a lower temperature than that of any individual component of the mixture. Impurities or trace minerals are also in the aluminum alloy composition to a limited extent. Exemplary impurities include from about 0.0 weight % to about 0.25 weight % copper; from about 0.0 weight % to about 0.35 weight % zinc, and less than about 0.05 weight %, preferably less than or equal to about 0.01 weight % and even more preferably less than or equal to about 0.001 weight % of other trace materials. For example, zinc is limited to prevent micro-porosity and surface cracking in the cast structural component. However, considerations are made as zinc provides natural age hardening as is known in the industry.

In various embodiments, a small amount of titanium is optionally added as a grain refiner. In such embodiments, the titanium is present at greater than or equal to 0.0 weight percent to less than or equal to 0.25 weight %, preferably from greater than 0.1 weight % to less than or equal to 0.15 weight % of the total aluminum alloy material.

In certain embodiments, other compounding materials are wholly excluded and the aluminum-based alloy consists essentially of a precise formulation. In such select embodiments, it is believed that formulations within this range provide specific benefits of ductility and elongation based on the relative quantities and the exclusion of other components. For example, in select embodiments, nickel is excluded from the present teachings at more than a trace level.

In an example of such select embodiments, the aluminum-based alloys may consist essentially of silicon at from 8 weight % to 11.6 weight %, manganese at from 0.8 weight % to 1.9 weight %, iron at from 0.1 weight % to 0.5 weight %, magnesium at from 0.2 weight % to 0.7 weight %, boron at from 0.002 weight % to 0.15 weight %, strontium at from 0.006 weight % to 0.017 weight %, from 0.0 weight % to 0.25 weight % copper, from 0.0 weight % to 0.35 weight % zinc, from 0.0 weight % to about 0.25 weight % titanium, less than about 0.1 weight % of each other trace material, with the remainder being aluminum, including all respective sub-ranges for each listed component. As an example, the manganese in such an embodiment can be from 0.8 weight % to 1.2 weight % according to the present teachings.

Various embodiments of the present disclosure employ methods of forming casted structural components that employ certain aluminum alloy compositions that optimize silicon and manganese content to increase fluidity, resist die soldering, and increase elongation in die-casting processes. The aluminum alloy is heated to the appropriate temperature to facilitate dispensing into the mold. The aluminum alloy takes the shape of an interior portion of the mold after the part is solidified. The part is then removed from the mold and prepared for use as a structural component, such as those detailed above.

In summary, in various aspects, methods of forming a structural component are provided. An aluminum alloy material is melted to the appropriate temperature for casting. The aluminum alloy includes silicon at from about 8 weight % to about 11.6 weight %, manganese at from about 0.8 weight % to about 1.9 weight %, iron at from about 0.1 weight % to about 0.5 weight %, magnesium at from about 0.2 weight % to about 0.7 weight %, boron at from about 0.002 weight % to about 0.15 weight %, strontium at from about 0.006 weight % to about 0.017 weight %, less than about 0.25 weight % copper, less than about 0.35 weight % zinc, less than about 0.25 weight % titanium and a balance of aluminum. In select aspects, the silicon is greater than or equal to 10 weight % and the manganese is greater than or equal to 1 weight % of the aluminum alloy.

In various aspects, the aluminum-based alloys can be used in a casting process, such as die-casting. During casting, the aluminum alloy is liquefied to a molten state. Cast parts, like structural components, are generally formed by pouring the molten aluminum alloy into a casting mold cavity (often formed by several mold pieces that together define an open cavity having a shape of the structural component, which may also include one or more cores). The molten material enters the casting mold to fill the casting mold cavity. As the molten material cools and solidifies, it has a shape corresponding to the cavity (and optionally also defined by the presence of cores). The mold is later separated from the structural component after solidification, where it can then be further processed (e.g., machined). The aluminum alloys of the present disclosure are particularly suitable for die-casting, where prior to introducing the molten metal to the mold cavity, it is passed through at least one die having one or more apertures or orifices. The aluminum alloys of the present disclosure exhibit particularly beneficial advantages with regard to die soldering. Die soldering is an unfavorable die-casting phenomenon that occurs in aluminum die-casting when the cast metal (aluminum alloy) adheres to or bonds with the die (or mold) by any of several mechanisms. As the aluminum alloy contacts or passes through the die or mold wall, it can undesirably remain adhered to the mold or die upon solidification and ejection of the part. Eventually, the cast aluminum alloy material builds up and production must be interrupted for cleaning. However, aluminum alloy compositions of the present disclosure have been observed to beneficially exhibit minimal die soldering behavior.

In certain variations, the present teachings further include optionally treating the aluminum alloy or treating a structural component formed from the aluminum alloy with a heat treatment process, such as an annealing process. An annealing process refers to heating a metal material to and holding the metal material at a suitable temperature followed by cooling. For example, an annealing process can slowly heat a metal material to a temperature that permits modification of a metal alloy's microstructure, for example, where recrystallization occurs. The annealing process can improve subsequent machinability and cold working of the structural component, if needed, and also improves the mechanical properties of the structural component.

In the annealing process, the structural component is placed in proximity to a heat source, such as a furnace or an oven (for convenience, the heat source will be referred to herein as an oven). The oven has a starting temperature, which can be any suitable temperature at which the structural component may be exposed without compromising the integrity of the structural component. As a non-limiting example, the starting temperature is approximately room temperature (25 degrees Celsius or 72 degrees Fahrenheit) or equal to or less than about 100 degrees Fahrenheit (or 37 degrees Celsius). It is understood that the starting temperature in the oven or the starting temperature of the structural component may be higher or lower depending on the conditions in the surrounding area in which the oven is contained or depending on the storage conditions of the structural component.

After the structural component is placed in the oven, the oven is heated to a final holding temperature, which depends upon the specific properties of the alloy composition to be treated and the resultant microstructure desired from the annealing process. For example, in certain variations, the final holding temperature is about 500 degrees Fahrenheit (260 degrees Celsius) to about 800 degrees Fahrenheit (427 degrees Celsius), including all sub-ranges. In other aspects, the final holding temperature is less than or equal to about 700 degrees Fahrenheit (371 degrees Celsius), including all sub-ranges. In further aspects, the final holding temperature is 640 degrees Fahrenheit (338 degrees Celsius) to 660 degrees Fahrenheit (349 degrees Celsius), including all sub-ranges. In still other aspects, the final holding temperature is less than or equal to about 650 degrees Fahrenheit (343 degrees Celsius), including all sub-ranges.

In certain variations, the heating of the structural component and consequently the heat source or oven is conducted at a slow rate to reach the final holding temperature. For example, a rate of heating in the heat source can be greater than or equal to about 50 degrees Fahrenheit (10 degrees Celsius) per hour to less than or equal to about 200 degrees Fahrenheit (93 degrees Celsius) per hour, optionally greater than or equal to about 75 degrees Fahrenheit (24 degrees Celsius) per hour to less than or equal to about 175 degrees Fahrenheit (79 degrees Celsius) per hour, optionally greater than or equal to about 100 degrees Fahrenheit per hour to less than or equal to about 150 degrees Fahrenheit (66 degrees Celsius) per hour. Further, the rate may vary with time and is not necessarily constant through the heating process to reach the final holding temperature.

Figure 6:
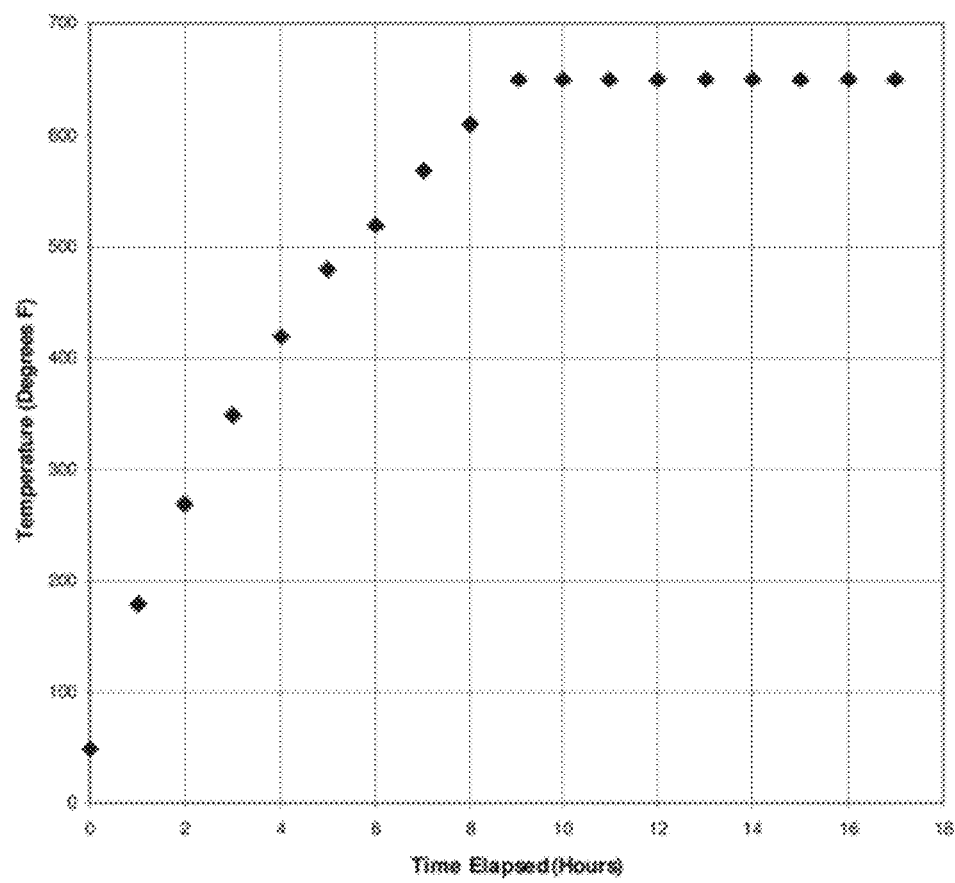
FIG. 6 is a chart representing a heat treatment of the aluminum alloy according to various aspects of the present teachings.

With reference to FIG. 6 by way of example, the temperature in the oven is gradually increased over several hours until the final holding temperature is reached. The amount of time required to reach the final holding temperature depends on the capacity of the oven, the number of structural components in the oven, circulation of air in the oven, and any temperature variations within the oven. For example, an oven containing only ten structural components would have a lower ramp-up time to the final holding temperature as compared to an oven containing only two structural components. This is due to the heat distribution in the oven and relative heating of the structural components. As can be seen in FIG. 6, initially, during the first hour of heating from room temperature, a rate of heating is approximately 175 degrees Fahrenheit per hour. The rate of heating is gradually decreased as the oven approaches the predetermined final holding temperature, so that during six to eight hours of elapsed time, the rate of heating is approximately 50 degrees Fahrenheit per hour.

As a non-limiting example, a total amount of time required to heat the oven from an initial temperature to a final holding temperature ranges from greater than or equal to 1 hour to less than or equal to 2 days, including all sub-ranges. In select aspects, the time required to heat the oven ranges from about 3 hours to about 15 hours, including all sub-ranges. In still other aspects, the time required to heat the oven ranges from about 5 hours to about 10 hours. As appreciated by one of skill in the art, the amount of time needed to heat the oven can be modified based on the capacity of the oven, the number of structural components in the oven, circulation of air in the oven, and any temperature variations within the oven.

When the final holding temperature is achieved, the oven and structural components are held in the oven at that temperature for a treatment period. During the time when the structural components are heated in the oven, the structural components and the surrounding temperature in the oven may reach equilibrium in that the temperature within the oven is the same as the temperature of the structural components. In various aspects, the temperature in the oven reaches the final holding temperature. In other various aspects, the temperature of the structural components reaches the final holding temperature.

Further, it is understood that a slight amount of variance in the final holding temperature is tolerable and may be noticed due to inherent variation in control systems around the predetermined temperature set-point, as well as due to inefficiency in the oven or in a thermometer measuring the temperature within the oven. It is optimal to keep any temperature variation to a maximum of 10% of the desired final holding temperature; optionally a maximum of 5% of the desired final holding temperature; optionally within 1% of the desired final holding temperature, and in certain aspects, optionally within 0.5% of the desired final holding temperature.

In various aspects, a treatment period during which the structural components are held in the oven at the final holding temperature is greater than or equal to about 1 hour to less than or equal to about 24 hours, including all sub-ranges. In other aspects, the treatment period for the structural components in the oven at the final holding temperature is less than or equal to about 18 hours. In other aspects, the structural components are held in the oven at the final holding temperature for a treatment period of about 5 hours to about 15 hours, including all sub-ranges. In still other aspects, the treatment period for structural components held in the oven at the final holding temperature is about 8 hours to about 10 hours, including all sub-ranges.

The annealing process modifies the structural components. In certain aspects, structural components made from the subject aluminum alloy and not subjected to the above-detailed annealing process have a hardness of from about 95 to about 105 HRH (Rockwell Hardness H Scale). In other variations, structural components made from the subject aluminum alloy and subjected to the above-detailed annealing process have a lower hardness than comparative structural components that were not subjected to the annealing process. For example, structural components made from the subject aluminum alloy and subjected to the annealing process have a hardness from about 75 to about 90 HRH, including all sub-ranges. In certain variations, structural components made from the inventive aluminum alloy and subjected to the annealing process have a nominal hardness of about 88 HRH, wherein the hardness can range from greater than or equal to about 84.5 to less than or equal to about 91.5 HRH, including all sub-ranges. In other variations, structural components made from the inventive aluminum alloy and subjected to the annealing process have a nominal hardness of about 87.25 HRH, where the hardness can range from greater than or equal to about 81.5 HRH to less than or equal to about 93 HRH, including all sub-ranges. Such a heat treatment or annealing process resulting in a reduced hardness may have particular advantages in a structural part. In still other aspects, the structural components made from the subject aluminum alloy and subjected to the above-detailed annealing process have a hardness of from about 81 to about 88 HRH, including all sub-ranges. In still other aspects, the structural components made from the subject aluminum alloy and subjected to the above-detailed annealing process have an average nominal hardness of about 85 HRH.

After structural components are heated for the annealing process, they are then cooled. The cooled structural components are then incorporated into a larger system, such as the compressor 10, as a non-limiting example.

In various aspects, the aluminum alloy material is cast into a shape of the structural component. In certain aspects, the casting is achieved in various embodiments by a die-casting technique that employs one or more dies and one or more molds. The aluminum alloys are solidified into a solid shape of a structural component for a compressor.

In various aspects, the solid component formed by the casting process has a percentage of elongation of greater than or equal to 7%. In certain aspects, the solid component formed by the casting process has a percentage of elongation at greater than or equal to 8%. In still other aspects, the component has a percentage of elongation of greater than or equal to about 9%. In select embodiments, the component formed from such a process has a tensile strength of greater than or equal to about 38,000 psi or in certain variations, greater than or equal to about 40,000 psi.

Optionally, nickel may be restricted from the alloy in an amount that is greater than an impurity or trace amount (e.g., no greater than about 0.5 weight % of the alloy composition). In other embodiments, nickel is included at less than about 3 weight %, preferably from greater than 0.5 weight % to less than 1.5 weight %. It is believed that such embodiments may be suitable for high temperature applications, such as piston or a bearing, as non-limiting examples.

In still other features of the present teachings, methods of forming a structural component include preparing an aluminum alloy having a synergistic amount of manganese and silicon, casting the aluminum alloy into a shape of the structural component, and solidifying the aluminum to have an elongation of greater than or equal to 7% and a tensile strength of greater than or equal to 38,000 psi. In certain aspects, the percentage of elongation is greater than or equal to 8%. In various aspects, the elongation is greater than or equal to 9%. In still other aspects, the tensile strength is greater than or equal to 40,000 psi. The structural component is for a compressor; a refrigeration device; or a heating, ventilation, and air conditioning device in various aspects.

In such other features, the aluminum alloy includes silicon at from about 8 weight % to about 11.6 weight %, manganese at from about 0.8 weight % to about 1.9 weight %, iron at from about 0.1 weight % to about 0.5 weight %, magnesium at from about 0.2 weight % to about 0.7 weight %, boron at from about 0.002 weight % to about 0.15 weight %, strontium at from about 0.006 weight % to about 0.017 weight %, less than about 0.25 weight % copper, less than about 0.35 weight % zinc, less than about 0.25 weight % titanium and a balance of aluminum. In other aspects, the synergistic amount of manganese and silicon comprises from about 1 weight % to about 1.2 weight % of manganese and from about 9 weight % to about 10 weight % silicon. The aluminum alloys of such embodiments are essentially free from other components at more than a trace impurity level, such as nickel or copper.

In still other aspects an aluminum alloy consists essentially of: silicon at from 8 weight % to 11.6 weight %; manganese at from 0.8 weight % to 1.9 weight %; iron at from 0.1 weight % to 0.5 weight %; magnesium at from 0.2 weight % to 0.7 weight %; boron at from 0.002 weight % to 0.15 weight %; strontium at from 0.006 weight % to 0.017 weight %; less than about 0.25 weight % copper; less than about 0.35 weight % zinc; less than about 0.25 weight % titanium; and a balance weight percent of aluminum. In other related features, the silicon is present at from 9 weight % to 10 weight %. In still other related features, the manganese is present at from 0.8 weight % to 1.2 weight %.

In additional features of the present teachings, methods of forming a structural component include preparing an aluminum alloy, casting the aluminum alloy into a shape of the structural component, annealing the aluminum having the shape of the structural component at a temperature of from about 600 degrees Fahrenheit (316 degrees Celsius) to about 700 degrees Fahrenheit. In still other aspects, the aluminum is solidified to have an elongation of greater than or equal to 7% and a tensile strength of greater than or equal to 38,000 psi.

In further aspects the annealing is conducted for from about 1 hour to about 24 hours. In yet other aspects, the annealing is conducted for less than or equal to 18 hours. In still other aspects, the annealing is conducted for from about 8 hours to about 10 hours. The temperature at which the annealing is conducted is from about 640 degrees Fahrenheit to about 650 degrees Fahrenheit in other aspects.

In yet other aspects, the structural component is cooled after the annealing. The resultant structural component has a reduced hardness as compared to a structural component that is not subjected to the annealing. The resultant structural component has a hardness of from 5 to 30 HRH less than a comparable structural component that was not subjected to the annealing. The structural component subjected to the annealing process has a hardness of from about 81 to about 88 HRH in select aspects. In still other aspects, the structural components have a hardness of about 85 HRH.

In other features, the aluminum alloy includes silicon at from about 8 weight % to about 11.6 weight %, manganese at from about 0.8 weight % to about 1.9 weight %, iron at from about 0.1 weight % to about 0.5 weight %, magnesium at from about 0.2 weight % to about 0.7 weight %, boron at from about 0.002 weight % to about 0.15 weight %, strontium at from about 0.006 weight % to about 0.017 weight %, less than about 0.25 weight % copper, less than about 0.35 weight % zinc, less than about 0.25 weight % titanium and a balance of aluminum. The aluminum alloys of such embodiments are essentially free from other components at more than a trace impurity level, such as nickel or copper in select aspects.

Additionally, in various aspects, the elongation is greater than or equal to 7%. In other aspects, the elongation is greater than or equal to 9%. In still other aspects, the tensile strength is greater than or equal to 38,000 psi. Further, the tensile strength is greater than or equal to 40,000 psi in yet other aspects. The structural component is for a compressor; a refrigeration device; or a heating, ventilation, and air conditioning device in various aspects.

Still further features provide methods in which an aluminum alloy material, including a synergistic amount of silicon and manganese, is cast into a shape of the structural component. In certain aspects, the casting is achieved in various embodiments by a die-casting technique that employs one or more dies and one or more molds. The aluminum alloys are solidified into a solid shape of a structural component for a compressor. The solidified shape is heated in a heat source for annealing at a temperature of from about 600 degrees Fahrenheit to about 700 degrees Fahrenheit. The solid shape is subsequently machined in various aspects.

In still other aspects the heating to anneal is conducted for greater than or equal to about 1 hour to less than or equal to about 72 hours. In yet other aspects, the annealing is conducted for less than or equal to 18 hours. In still other aspects, the annealing is conducted for from about 8 hours to about 10 hours. The temperature at which the annealing is conducted is less than about 700 degrees Fahrenheit in various aspects. The temperature at which the annealing is conducted is about 640 degrees Fahrenheit to about 650 degrees Fahrenheit in other aspects.

In yet other aspects, the structural component is cooled after the annealing. The resultant structural component has a reduced hardness as compared to a comparative structural component that is not subjected to the heating/annealing process. The resultant structural component has a hardness of from 5 to 30 HRH less than a comparable structural component that was not subjected to the annealing. The structural component subjected to the annealing process has a hardness of from about 81 to about 88 HRH in select aspects. In still other aspects, the structural components have a hardness of about 85 HRH.

In other features, the aluminum alloy includes silicon at from about 8 weight % to about 11.6 weight %, manganese at from about 0.8 weight % to about 1.9 weight %, iron at from about 0.1 weight % to about 0.5 weight %, magnesium at from about 0.2 weight % to about 0.7 weight %, boron at from about 0.002 weight % to about 0.15 weight %, strontium at from about 0.006 weight % to about 0.017 weight %, less than about 0.25 weight % copper, less than about 0.35 weight % zinc, less than about 0.25 weight % titanium and a balance of aluminum. In other aspects, the synergistic amount of manganese and silicon comprises from about 1 weight % to about 1.2 weight % of manganese and from about 9 weight % to about 10 weight % silicon. The aluminum alloys of such embodiments are essentially free from other components at more than a trace impurity level, such as nickel or copper.

In various aspects, the elongation of the solidified alloy is greater than or equal to 7%. In certain aspects, the elongation of the solidified alloy is greater than or equal to 8%. In other aspects, the elongation of the solidified alloy is greater than or equal to 9%. In still other aspects, the tensile strength is greater than or equal to 38,000 psi. In still other aspects, the tensile strength is greater than or equal to 40,000 psi. The structural component is for a compressor; a refrigeration device; or a heating, ventilation, and air conditioning device in various aspects.

EXAMPLES

Experiments were conducted with various aluminum alloys and comparative standard alloys of A360 and A367. As detailed in Table 1 below (all values in weight percent), the formulations labeled Heat Treated Mod 1 and Mod 1 include 92.333 weight % of aluminum, 0.17 weight % of manganese, and 6.70 weight % of silicon. The formulation labeled Mod 2 includes 91.768 weight % of aluminum, 0.51 weight % of manganese, and 6.88 weight % of silicon. The formulation labeled Mod 3 includes 90.003 weight % of aluminum, 1.04 weight of manganese, and 8.02 weight % of silicon. The formulation labeled Mod 4 includes 88.567 weight % of aluminum, 1.11 weight % of manganese, and 8.02 weight % of silicon. Still other alloying components are detailed in Table 1.

TABLE 1

Alloy Formulations with Component Amounts (weight percentage)

| Component | A360 | A367 | Heat Treated Mod 1 Formula | Mod 1 Formula | Mod 2 Formula | Mod 3 Formula | Mod 4 Formula |
| --- | --- | --- | --- | --- | --- | --- | --- |
| Al | 88.051 | 89.171 | 92.333 | 92.333 | 91.768 | 90.003 | 88.567 |
| Mn | 0.16 | 0.48 | 0.17 | 0.17 | 0.51 | 1.04 | 1.11 |
| Si | 9.43 | 9.16 | 6.70 | 6.70 | 6.88 | 8.02 | 9.34 |
| Cr | 0.061 | 0.006 | 0.031 | 0.031 | 0.037 | 0.051 | 0.068 |
| Cu | 0.169 | 0.039 | 0.003 | 0.003 | 0.004 | 0.004 | 0.005 |
| Fe | 1.30 | 0.24 | 0.28 | 0.28 | 0.31 | 0.39 | 0.41 |
| Mg | 0.45 | 0.58 | 0.33 | 0.33 | 0.33 | 0.34 | 0.33 |
| Ni | 0.023 | 0.008 | 0.001 | 0.001 | 0.001 | 0.001 | 0.001 |
| Sn | 0.001 | 0.004 | 0.001 | 0.001 | 0.001 | 0.001 | 0.001 |
| Zn | 0.243 | 0.039 | 0.003 | 0.003 | 0.002 | 0.002 | 0.003 |
| Sr | 0.001 | 0.164 | 0.009 | 0.009 | 0.012 | 0.011 | 0.012 |
| Pb | 0.010 | 0.006 | 0.002 | 0.002 | 0.001 | 0.001 | 0.001 |
| B | 0.004 | 0.015 | 0.004 | 0.004 | 0.006 | 0.010 | 0.013 |
| Zr | 0.0030 | 0.0060 | 0.0010 | 0.0010 | 0.0013 | 0.0020 | 0.0023 |
| Ti | 0.096 | 0.079 | 0.135 | 0.135 | 0.138 | 0.141 | 0.143 |
| Total Weight Percentage | 100 | 100 | 100 | 100 | 100 | 100 | 100 |

The aluminum-based alloy compositions labeled Mod 3 and Mod 4 have the greatest weight percentages of silicon and manganese of all the samples. In accordance with the present teachings, the amount of manganese is significantly higher than the traditionally taught maximum of 0.8 weight %. Mod 3 includes manganese at 1.04 weight % and Mod 4 includes manganese at 1.11 weight %. Interestingly, by increasing the amount of manganese along with the higher levels of silicon, synergistic benefits are noted. A summary of the average tensile strength (psi), yield strength (psi), and percent elongation of the various samples is provided below in Table 2. The average tensile strength, yield strength, and percent elongation were calculated by taking the respective measurements at fracture locations at the center and outer periphery of cast pieces formed using the respective alloy formulations.

TABLE 2

Comparative Tensile Strength, Yield Strength, and Average Elongation Percentage

|  | A360 | A367 | Heat Treated Mod 1 Formula | Mod 1 Formula | Mod 2 Formula | Mod 3 Formula | Mod 4 Formula |
|---|---|---|---|---|---|---|---|
| Average Tensile Strength (psi) | 37114 | 35667 | 25881 | 35406 | 37437 | 38023 | 41353 |
| Average Yield Strength (psi) | 23734 | 21059 | 15667 | 19746 | 20972 | 22414 | 22234 |
| Average Elongation Percentage | 4 | 5 | 6 | 7 | 7 | 7 | 9 |

Notably, the A360 and A367 standards have an average percent elongation of 4% and 5% respectively. As detailed above, these standards avoid high levels (greater than 0.8 weight %) of manganese and include 0.16 weight % and 0.48 weight %, respectively. The alloy of Mod 4 has the highest percentage of elongation at approximately 9%. This is nearly double the percent elongation of the A360 and A367 standards. Further, the average tensile strength is approximately 10% greater for Mod 4 than it is for A360 and A367.

Further, as shown in FIG. 1, the relative yield strength and percentage elongation of the various formulations are depicted. The alloy Mod 4 has the highest percentage of elongation at approximately 8.75% while the standard alloy A360 has a percent elongation of less than 4%. The increase of the manganese from a concentration of 0.16 weight % in A360 to a concentration of 1.11% of formulation Mod 4 indicates that the high level of manganese nearly doubles the percentage elongation.

Also as depicted in FIG. 1, the general trend is that with the increase in manganese concentration, there is also an increase in the percentage elongation. This is counter to conventional knowledge that discourages or deters compositions from including more than 0.8 weight % of manganese.

Figure 2:
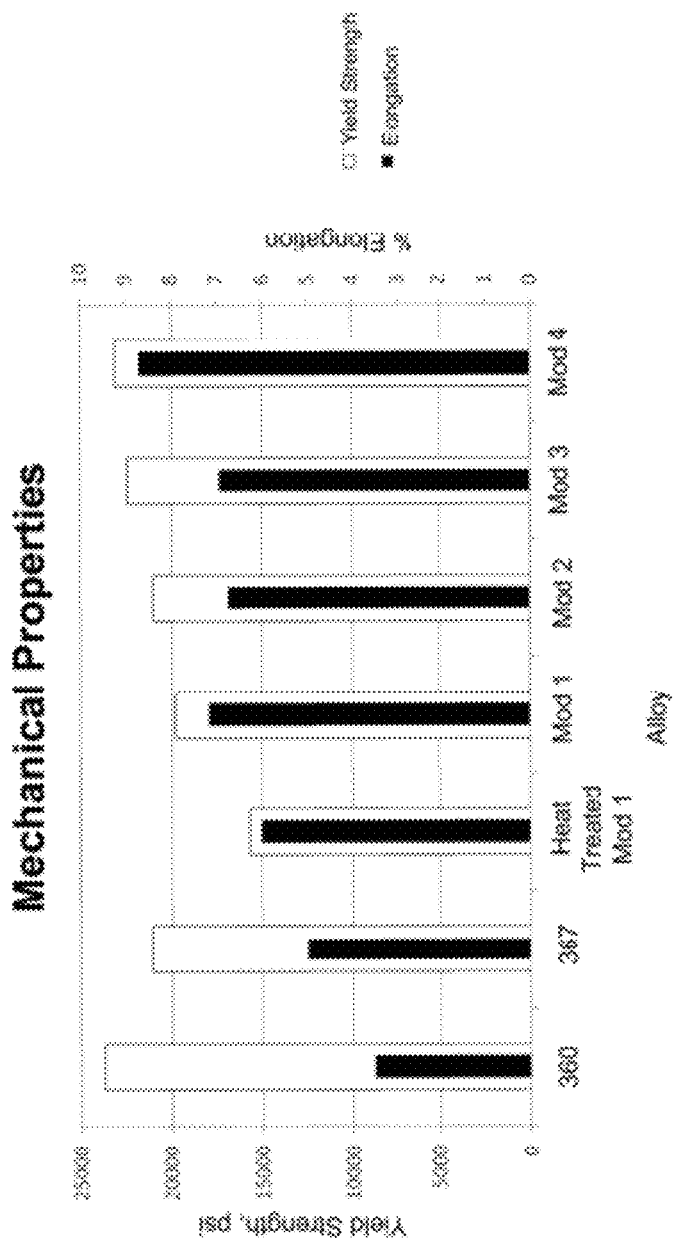
FIG. 2 is a chart representing mechanical properties of tested samples according to various aspects of the present teachings.

Turning to FIG. 2, the relative tensile strength of the alloy formulations are depicted. Notably, the tensile strength for the formulation of Mod 4 is between approximately 37,000 psi and 42,000 psi, while the formulation of comparative standard A360 is from about 33,000 psi to less than 40,000 psi. Mod 3, which has a manganese concentration of 1.04 weight %, has the second highest tensile strength of all samples and provided a maximum tensile strength of approximately 42,500 psi.

Figure 3:
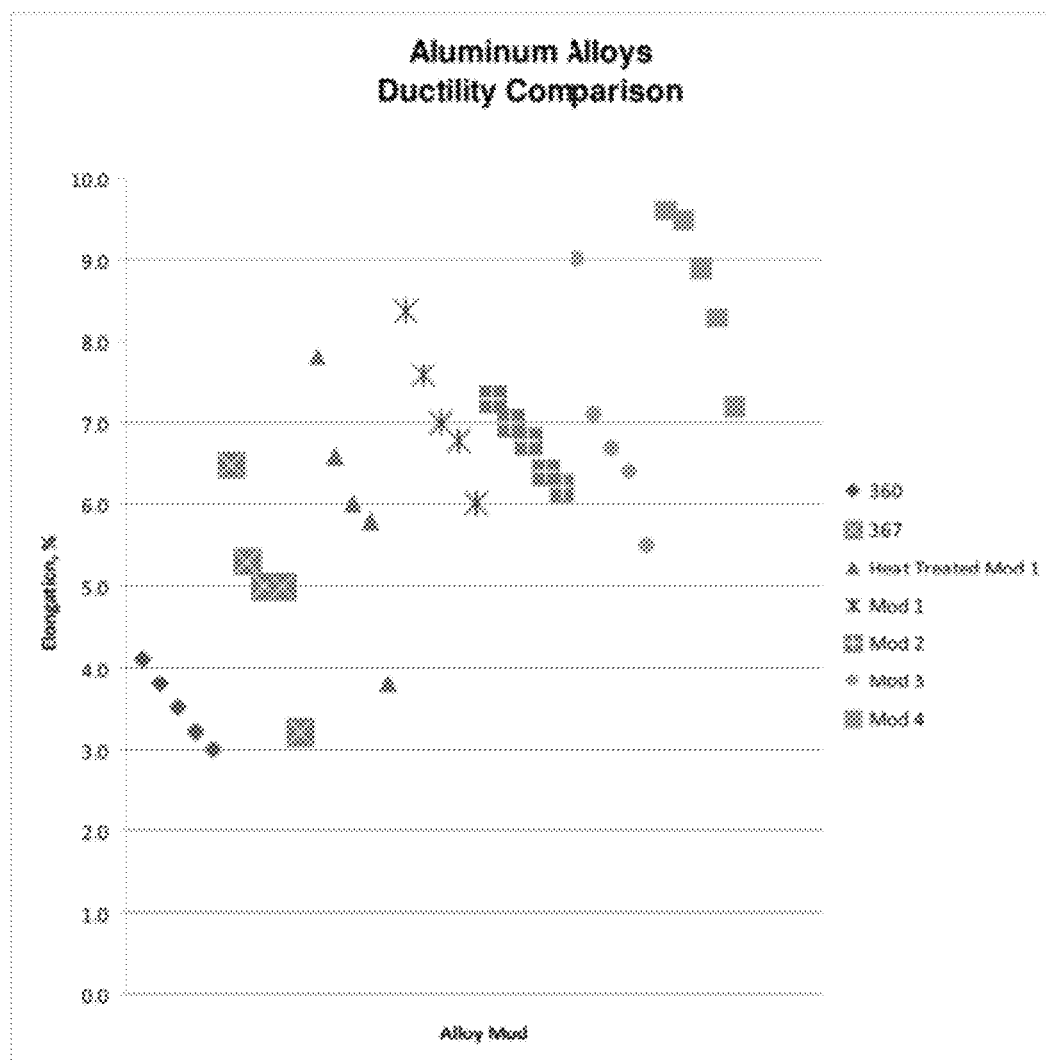
FIG. 3 is a chart representing the ductility comparison of tested samples according to various aspects of the present teachings.
Figure 5:
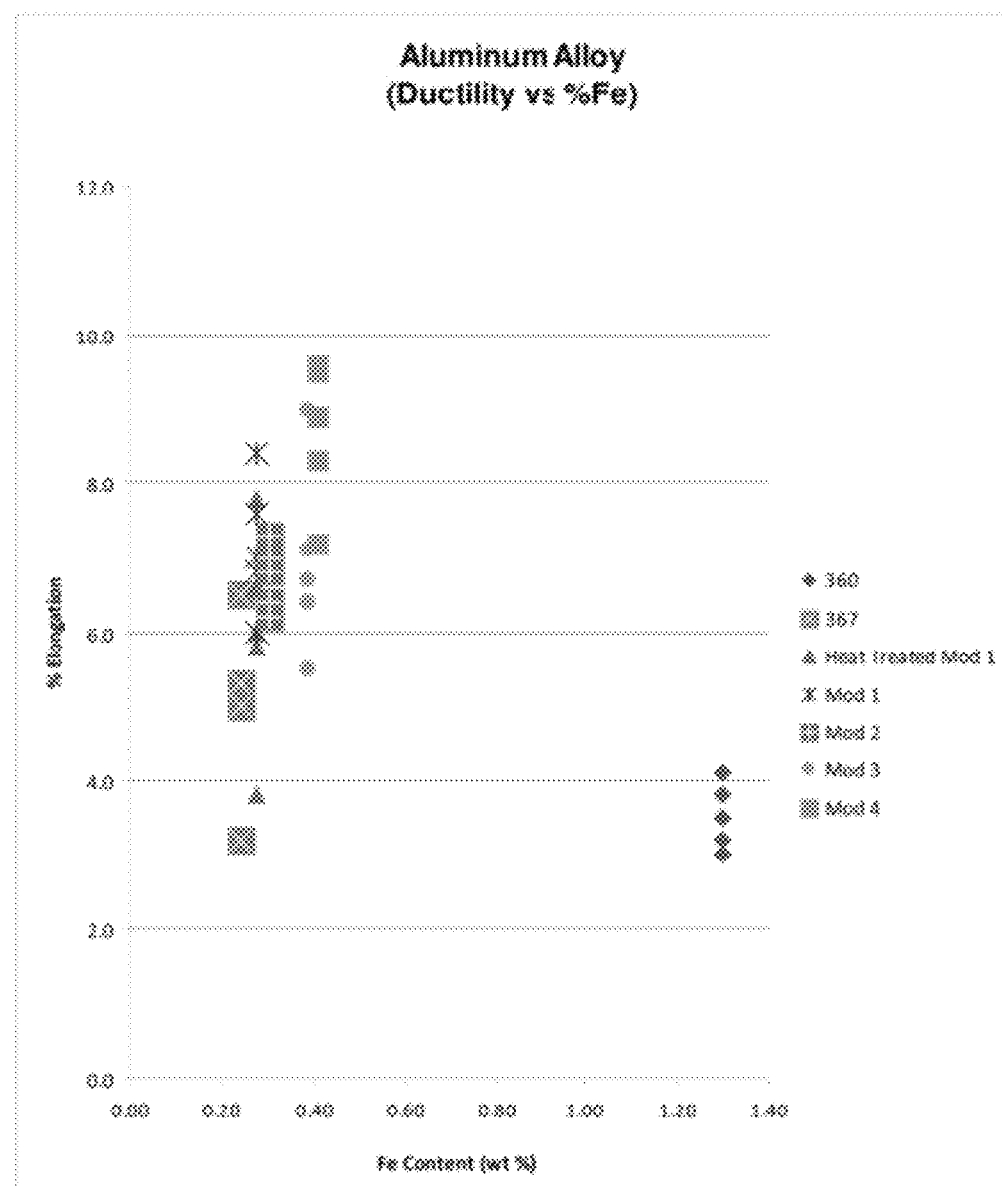
FIG. 5 is a chart representing the relative ductility and iron content of tested samples according to various aspects of the present teachings.

Turning to FIG. 3, the percentage elongation of the various samples is presented. The alloy formulation labeled Mod 4 has the highest percentage elongation average of 9%. The various data points for Mod 4 ranged from 7.2% to 9.6% elongation. The alloy formulation labeled Mod 3 has the second highest percentage elongation average of 7%. The various data points for Mod 3 ranged from 5.5% to 9% elongation. The comparative standard A360 had a percentage elongation average of only 4%. The lowest data point for the comparative standard A360 was only 3%. Accordingly, the percentage elongation was improved by up to 300% when using the instant aluminum alloys. Similarly, as shown in FIG. 5, the percentage elongation as compared to the iron content level in the various alloys also demonstrates that the synergistic and high levels of silicon and manganese contribute to the markedly increased elongation of the instant alloys.

Figure 4:
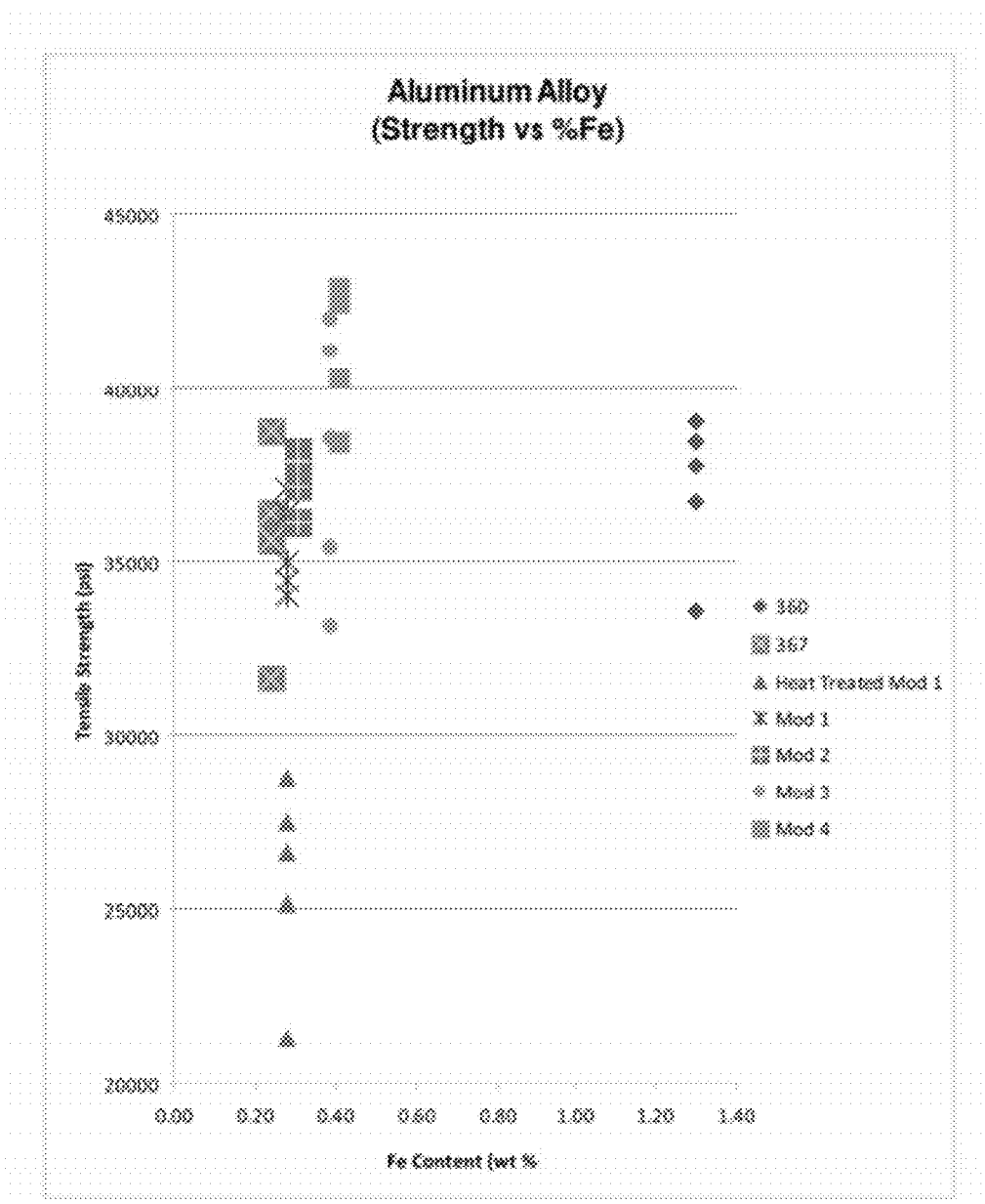
FIG. 4 is a chart representing the relative tensile strength and iron content of tested samples according to various aspects of the present teachings.

Turning to FIG. 4, the strength of the various samples as compared to the percentage of iron is presented. Generally, all of the samples (excluding A360) had an iron content of from about 0.1 weight % to about 0.4 weight %. The samples Mod 3 and Mod 4, which include the high and synergistic levels of silicon and manganese, demonstrated the highest tensile strength. The standards A360 and A367 had similar tensile strength, even though the iron content of A360 was 1.3 weight % and the iron content of A367 was 0.24 weight %.

An exemplary annealing process is as follows. Twenty-four (24) structural components were prepared using an aluminum alloy in accordance with certain aspects of the instant teachings. An annealing process was performed in an oven having internal dimensions of 8 feet by 7 feet by 6 feet and having three fans to facilitate heat distribution. The twenty-four structural components were thus placed in the oven. The oven was incrementally heated over a period of 9 hours to a final holding temperature of 650 degrees Fahrenheit. The structural components were maintained in the oven that was heated to 650 degrees Fahrenheit for 7.5 hours. The average hardness of the structural components was 85 HRH.

Those skilled in the art can now appreciate from the foregoing discussion that the broad teachings of the present disclosure can be implemented in a variety of forms. It should be appreciated that the foregoing description of the present teachings is merely exemplary in nature and, thus, variations that do not depart from the gist of the teachings are intended to be within the scope of the teachings. Such variations are not to be regarded as a departure from the spirit and scope of the teachings.

What is claimed:

1. A method of forming a structural compressor component for a compressor comprising:
    casting a molten aluminum alloy material to form a solid structural compressor component, wherein the aluminum alloy material comprises:
    silicon at greater than about 8 weight % to less than 10 weight % of the aluminum alloy material;
    manganese at greater than or equal to about 0.8 weight % to less than or equal to about 1.9 weight % of the aluminum alloy material;
    iron at greater than or equal to about 0.1 weight % to less than or equal to about 0.5 weight % of the aluminum alloy material;
    magnesium at greater than or equal to about 0.2 weight % to less than or equal to about 0.7 weight % of the aluminum alloy material;

boron at greater than or equal to about 0.002 weight % to less than or equal to about 0.15 weight % of the aluminum alloy material;

strontium at greater than or equal to about 0.006 weight % to less than or equal to about 0.017 weight % of the aluminum alloy material;

less than or equal to about 0.25 weight % copper of the aluminum alloy material;

less than or equal to about 0.35 weight % zinc of the aluminum alloy material;

less than or equal to about 0.25 weight % titanium of the aluminum alloy material; and a balance of the aluminum alloy material being aluminum;

annealing the solid structural compressor component by exposure to a heat source having a holding temperature of greater than or equal to about 500° F. to less than or equal to about 800° F. for greater than or equal to five hours to less than or equal to 24 hours, wherein after the annealing, the solid structural compressor component has a hardness of greater than or equal to about 75 to less than or equal to about 90 HRH (Rockwell Hardness H Scale) and a percentage of elongation of greater than or equal to 7%; and machining the solid structural compressor component for incorporation into the compressor.

2. The method of claim 1, wherein the structural compressor component has a percentage of elongation of greater than or equal to about 9%.

3. The method of claim 1, wherein the structural compressor component has a tensile strength of greater than or equal to about 38,000 psi.

4. The method of claim 1, wherein the structural compressor component has a tensile strength of greater than or equal to about 40,000 psi.

5. The method of claim 1, wherein the aluminum alloy material comprises nickel at no greater than a trace impurity amount of less than or equal to about 0.05 weight % of the aluminum alloy material.

6. The method of claim 1, wherein the casting is a die-casting process where the molten aluminum alloy material passes through a die during the casting process.

7. The method of claim 1, wherein the manganese comprises greater than or equal to 1 to less than or equal to 1.2 weight % of the aluminum alloy material.

8. A method of forming a structural compressor component for a compressor comprising:
a. die-casting an aluminum alloy comprising a synergistic amount of manganese and silicon comprising greater than or equal to about 1 weight % to less than or equal to about 1.2 weight % of manganese in the aluminum alloy and from greater than or equal to about 9 weight % to less than or equal to about 10 weight % silicon in the aluminum alloy;
b. solidifying the aluminum alloy to form the structural compressor component, wherein the solidified aluminum alloy has an elongation of greater than or equal to 7% and a tensile strength of greater than or equal to 38,000 psi;
c. heating the solid structural compressor component by exposure to a heat source having a rate of heating of greater than or equal to about 50° F. per hour to less than or equal to about 200° F. per hour to reach a holding temperature; and
d. annealing the aluminum alloy for greater than or equal to five hours to less than or equal to 24 hours at the holding temperature of greater than or equal to about 500° F. to less than or equal to about 800° F., so that the solid structural compressor component has a hardness of greater than or equal to about 75 to less than or equal to about 90 HRH (Rockwell Hardness H Scale).

9. The method of claim 8, wherein the aluminum alloy further comprises:
iron at greater than or equal to about 0.1 weight % to less than or equal to about 0.5 weight % of the aluminum alloy;
magnesium at greater than or equal to about 0.2 weight % to less than or equal to about 0.7 weight % of the aluminum alloy;
boron at greater than or equal to about 0.002 weight % to less than or equal to about 0.15 weight % of the aluminum alloy;
strontium at greater than or equal to about 0.006 weight % to less than or equal to about 0.017 weight % of the aluminum alloy;
less than or equal to about 0.25 weight % copper of the aluminum alloy;
less than or equal to about 0.35 weight % zinc of the aluminum alloy;
less than or equal to about 0.25 weight % titanium of the aluminum alloy; and
a balance of the aluminum alloy being aluminum.

10. The method of claim 9, wherein the aluminum alloy comprises nickel at no greater than a trace impurity amount of less than or equal to about 0.05 weight % of the aluminum alloy.

11. The method of claim 9, wherein the aluminum alloy comprises copper at no greater than a trace impurity amount of less than or equal to about 0.05 weight % of the aluminum alloy.

12. The method of claim 8, wherein the elongation is greater than or equal to 9%.

13. The method of claim 8, wherein the tensile strength is greater than or equal to 40,000 psi.

14. The method of claim 8, wherein the annealing occurs at a temperature of about 600° F. to about 700° F.

15. The method of claim 8, wherein the rate of heating is greater than or equal to about 100° F. per hour to less than or equal to about 150° F. per hour.

16. The method of claim 8, wherein the annealing at the holding temperature occurs for greater than or equal to about 8 hours to less than or equal to about 10 hours.

17. A method of forming a structural scroll compressor component for a scroll compressor comprising:
casting a molten aluminum alloy material to form a solid scroll compressor structural component, wherein the aluminum alloy material comprises:
silicon at greater than or equal to about 8 weight % to less than or equal to about 10 weight % of the aluminum alloy material;
manganese at greater than 1 weight % to less than or equal to about 1.9 weight % of the aluminum alloy material;
iron at greater than or equal to about 0.1 weight % to less than or equal to about 0.5 weight % of the aluminum alloy material;
magnesium at greater than or equal to about 0.2 weight % to less than or equal to about 0.7 weight % of the aluminum alloy material;
boron at greater than or equal to about 0.002 weight % to less than or equal to about 0.15 weight % of the aluminum alloy material;
strontium at greater than or equal to about 0.006 weight % to less than or equal to about 0.017 weight % of the aluminum alloy material;

less than or equal to about 0.25 weight % copper of the aluminum alloy material;

less than or equal to about 0.35 weight % zinc of the aluminum alloy material;

less than or equal to about 0.25 weight % titanium of the aluminum alloy material; and a balance of the aluminum alloy material being aluminum;

annealing the solid scroll compressor structural component by exposure to a heat source having a holding temperature of greater than or equal to about 500° F. to less than or equal to about 800° F. for greater than or equal to five hours to less than or equal to 24 hours, wherein after the annealing, the solid scroll compressor structural component has a hardness of greater than or equal to about 75 to less than or equal to about 90 HRH (Rockwell Hardness H Scale) and a percentage of elongation of greater than or equal to 7%; and machining the solid scroll compressor structural component for incorporation into the scroll compressor.

* * * * *